United States Patent [19]
Gay

[11] Patent Number: 5,608,795
[45] Date of Patent: Mar. 4, 1997

[54] TELEPHONE LINE INTERFACE CIRCUIT

[75] Inventor: Michael J. Gay, Vaud, Switzerland

[73] Assignee: Motorola, Inc., Schaumburg, Ill.

[21] Appl. No.: 419,888

[22] Filed: Apr. 11, 1995

[30] Foreign Application Priority Data

Apr. 26, 1994 [GB] United Kingdom .................. 9408283

[51] Int. Cl.⁶ .................................................. H04M 19/00
[52] U.S. Cl. ............................................. 379/399; 379/394
[58] Field of Search ...................................... 379/399, 402,
379/403, 404, 405, 413, 388, 387, 385,
394, 398

[56] References Cited

U.S. PATENT DOCUMENTS

| | | | |
|---|---|---|---|
| 4,796,295 | 1/1989 | Gay | 379/392 |
| 4,982,426 | 1/1991 | Jakab | 379/402 |
| 5,014,305 | 5/1991 | Moisin | 379/402 |
| 5,138,658 | 8/1992 | Carter | 379/399 |
| 5,274,704 | 12/1993 | Jakab | 379/399 |
| 5,323,460 | 6/1994 | Warner | 379/399 |

FOREIGN PATENT DOCUMENTS 0096965 5/1983 European Pat. Off. ....... H04M 19/00

*Primary Examiner*—Ahmad F. Matar
*Assistant Examiner*—Thomas F. Presson
*Attorney, Agent, or Firm*—Harry A. Wolin; Robert D. Atkins

[57] ABSTRACT

A telephone line interface circuit has a transmit path for coupling to a telephone line and a receive path for coupling to the telephone line (2). The transmit path includes a first amplifier (A1) having an output for coupling to the line (2), a first input for receiving a signal to be transmitted and a second input for receiving a first sum signal made up of a.c. and d.c. line voltage signals plus a.c and d.c. line current signals. The feedback loop thus described has sufficient loop gain to constrain the first sum signal to be substantially equal to the signal at the first input. The receive path includes a second amplifier (A4) having a first input for receiving the first sum signal, a second input for receiving substantially twice a second sum signal made up of the a.c. and d.c. line current signals plus the d.c. line voltage signal/and an output for providing receive signals. The circuit thus presents a predetermined impedance to the telephone line (2) and also provides hybrid balance when the impedance of the line (2) is substantially equal to the predetermined impedance.

5 Claims, 1 Drawing Sheet

TELEPHONE LINE INTERFACE CIRCUIT

FIELD OF THE INVENTION

This invention relates to telephone line interface circuits.

BACKGROUND OF THE INVENTION

Telephone apparatus connected to a telephone line must, in general, present certain d.c. characteristics and a defined a.c. impedance in the signal band to the telephone line. The d.c. characteristics and the a.c. impedance specifications differ between countries.

The apparatus must also include a device for reducing the level, in its receive path, of a signal it transmits. This device is inevitably sensitive to the impedance presented to the apparatus by the telephone line. Ideally, the apparatus would be designed to provide the best rejection of its own transmitted signals for the impedance presented by the telephone line in use, which is termed the best hybrid balance. This has been approximated in previous circuits, for example the Motorola TCA3386 and TCA3388 circuits, by using a weighted sum of two impedance networks to define a hybrid balance impedance. This approach has the disadvantages that the gain of the receive path becomes frequency dependent, and that extra impedance networks are necessary beyond that required to define the impedance presented to the telephone line. These disadvantages become significant in programmable equipment designed for portable use in a number of countries because different networks will be required for each country.

BRIEF SUMMARY OF THE INVENTION

It is therefore an object of the present invention to overcome or, at least mitigate, the above-mentioned disadvantages.

Accordingly, the invention provides a telephone line interface circuit having a transmit path for coupling to a telephone line and a receive path for coupling to the telephone line, the transmit path including a first amplifier means having an output for coupling to the line, a first input for receiving a signal to be transmitted and a second input for receiving a first sum signal comprising a.c. and d.c. line voltage signals plus a.c and d.c. line current signals, feedback means coupled between the output of said first amplifier means and said second input thereof via the telephone line for constraining said first sum signal to be substantially equal to the signal at the first input, the receive path comprising a second amplifier means having a first input for receiving said first sum signal, a second input for receiving substantially twice a second sum signal comprising said a.c. and d.c. line current signals plus the d.c. line voltage signal and an output for providing receive signals, whereby the circuit presents a predetermined impedance to the telephone line and also provides hybrid balance when the impedance of the line is substantially equal to said predetermined impedance.

In one embodiment, the a.c. line current signal is obtained from the telephone line via a network comprising reactive elements such that the predetermined impedance is complex. Preferably, said network is one of a plurality of networks, each of which can be switched in to the path of the a.c. line current signal, whereby each of said networks causes a different predetermined impedance to be presented to the telephone line. Preferably, the d.c. line voltage signal is obtained from the telephone line via a non-linear processing circuit means such that the interface circuit presents a predetermined non-linear d.c. characteristic to the telephone line. Preferably, the non-linear processing circuit means is programmable such that the predetermined non-linear d.c. characteristic presented to the telephone line can be varied.

BRIEF DESCRIPTION OF THE DRAWINGS

One embodiment of the invention will now be more fully described, by way of example, with reference to the drawing which shows a schematic diagram of a telephone line interface circuit.

DETAILED DESCRIPTION

Figure 1:
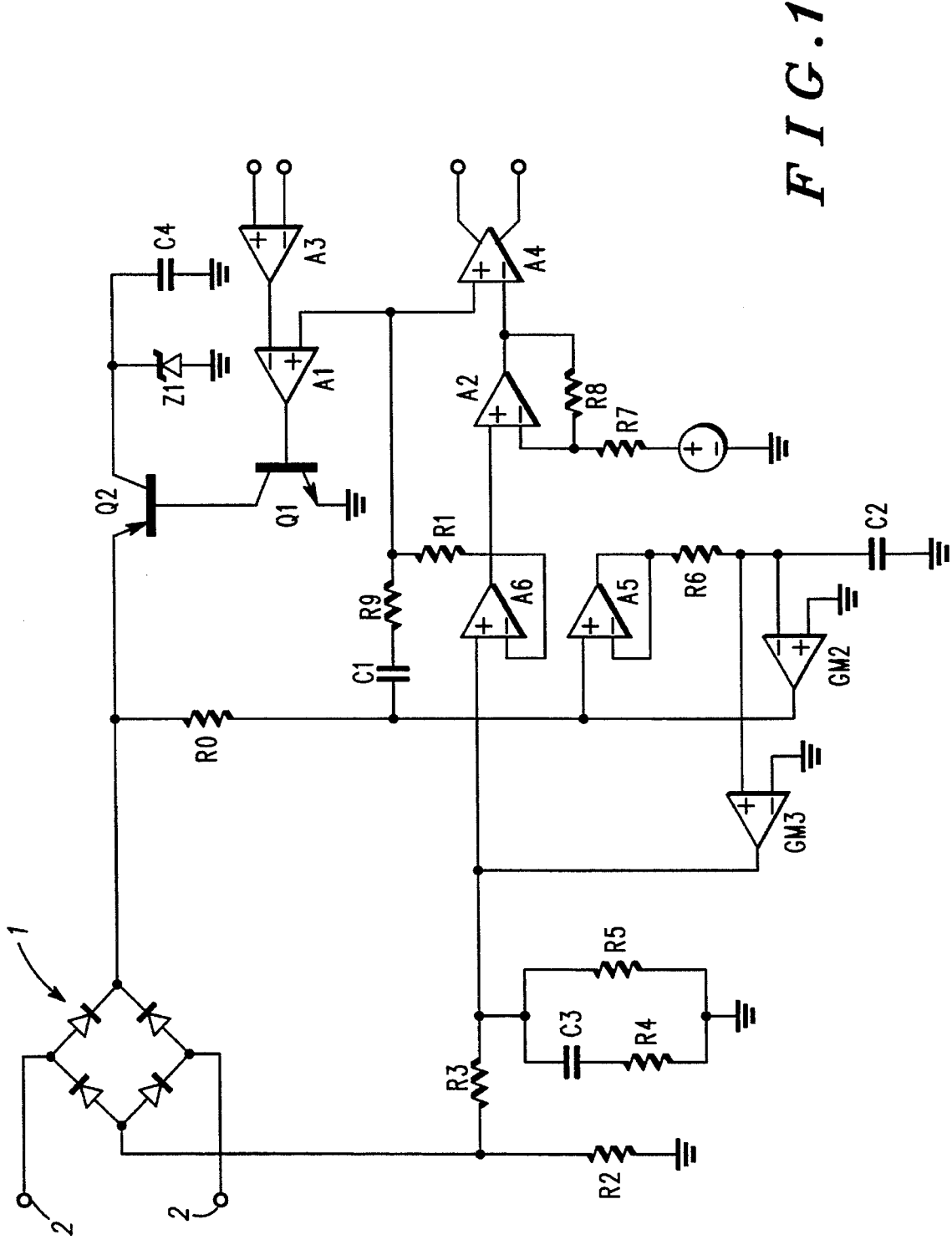

Thus, as shown in the drawing, the circuit includes a diode bridge 1 to provide the correct polarity voltage to the ensuing sections. The circuit contains a principle feed back loop comprising an operational amplifier A1 coupled to the telephone line 2 via transistors Q1, Q2, with feedback of the line voltage via resistor R0 and feedback of the line current via resistor R2. The transistors Q1, Q2 and the diode bridge 1 are high voltage devices, which may be external to the rest of the circuit. The collector of transistor Q2 is coupled to a Zener diode Z1, which is a simplified representation of an internal supply regulator and to reservoir capacitor C4.

A transmit portion of the circuit includes a balanced voltage amplifier A3 having its inputs coupled to receive send signals and its output coupled to the inverting input of operational amplifier A1. The output of the transmit amplifier A3 provides an output at a bias level V1, which is applied to the inverting input of operational amplifier A1. The overall feedback establishes the same level at the non-inverting input of operational amplifier A1. This level is produced at the output of unity gain amplifier A6, which is coupled to the non-inverting input of operational amplifier A1 via resistor R1. Amplifier A6 has an offset so the input voltage V0 required is a lower value than bias level V1.

To avoid matching problems, and to preserve the necessary isolation between sections, input voltage V0 is obtained by a potential divider from a bandgap reference and the V1 reference level is derived from the input voltage V0 via buffer amplifier A6 with Vbe offset (output higher).

A receive portion of the circuit includes a balanced voltage amplifier A4 and an amplifier A2. Amplifier A2 and its feedback network, provided by resistors R7 and R8, form a voltage amplifier with a gain of 2 (approx.). The amplifiers A2 and A4 receive bias voltage V1 from amplifier A6 at their non-inverting inputs and resistor R7 is returned to bias voltage V1 to retain dc balance.

In order to define the ac input impedance an RC network is provided between resistor R3 and amplifier A6, formed by resistors R4 and R5, and by capacitor C3. The network is one of a plurality, for example, four, and can be selected by switches (not shown) operating on the ground side. To avoid interaction with the d.c. mask, the switches connect the selected network to the same bias level V0 as that at the input of amplifier A6.

In the circuit, the line voltage sense resistor R0 must be large to satisfy the pulse dialling specifications, the line current sense resistor R2 must be small since the total incremental input resistance is low, the resistor R3 must be in the KΩ range so that the capacitor C3, which, with resistors R3, R4 and R5, forms part of the ac input impedance network, and must be precise, can be relatively small.

In operation, voltage applied to the circuit causes a current to flow through R0. This current is absorbed by amplifier Gm2 due to the local feedback loop formed by amplifier A5, resistor R6, capacitor C2 and amplifier Gm2. The voltage developed at the input of amplifier A5 will be determined by the transconductance of amplifier Gm2. It will cause amplifier Gm3 to feed a current determined by its transconductance through the resistor R3. The voltage thereby developed at the input of amplifier A6 is coupled via resistor R1 to amplifier A1 which drives the line interface transistors Q1 and Q2. Transistor Q2 current flows in a loop comprising the supply regulator Z1, the resistor R2, the diode bridge 1 and the telephone line 2. Thus virtually the full line current is available to power the circuit. The current level established will be such that the negative voltage developed across resistor R2 Compensates the positive voltage developed across resistor R3 by the output current of amplifier If the line voltage is $V_L$ and the line current $I_L$ then the voltage at the emitter of transistor Q2 with respect to the circuit ground is:

$$V_L - I_L R_2$$

and the line current will be given by:

$$\frac{V_L - I_L R_2\ gm_3}{R_0 + \frac{1}{gm_2}\ gm_2} R_3 = I_L R_2$$

where $gm_2$ and $gm_3$ are the transconductances of amplifiers $G_2$ and Gm3.

Hence:

$$\frac{V_L}{I_L} = R_2 + \frac{gm_2}{gm_3}\ \frac{R_2 \left( R_0 + \frac{1}{gm_2} \right)}{R_3}$$

The transconductance of amplifier Gm2 is necessarily relatively large, as the voltage which may be developed at the output of amplifier Gm2 is limited by the IC supply voltage. This must be low to avoid saturating transistor Q2 when the line voltage is low. Consequently the input resistance is essentially determined by the external components (resistors R0, R2 and R3) and the ratio of the transconductances of amplifiers Gm2 and Gm3.

The input resistance can be programmed by programming the transconductance ratio. Furthermore the resistance may be given a piecewise linear characteristic by making the transconductances piecewise linear.

The circuit can be programmed to have a constant current characteristic by replacing amplifier Gm3 by a current source.

It will be apparent that diode bridge 1 adds its offset voltage to the circuit's input voltage. An offset must also be generated at the input of amplifier A5 as amplifier Gm2 cannot absorb current at zero voltage: this also adds to the input voltage. These offsets are compensated by adding an offset current to the output of amplifier Gm3. This current is given a negative temperature coefficient to make the overall dc mask temperature independent.

In some circumstances the circuit may be submitted to excessive line voltages due to incorrect operation of the telephone line equipment. The consequence could be overheating and destruction of the high voltage transistors, particularly if the heat-sink areas have been minimised. Additionally, some countries have specifications limiting the maximum temperature of physically accessible equipment and these might not be satisfied. To avoid such problems the circuit includes a protection mode.

In this mode, the current flowing through resistor R0 and absorbed by amplifier Gm2 depends directly on the line voltage. Excess voltage is therefore detected by monitoring the input voltage of amplifier Gm2. A signal is sent to a timer (not shown) when a specific threshold, adapted to the dc mask programmed, is exceeded. After an interval the amplifier Gm3 is replaced by a fixed current generator, setting the line current to a low value.

When the line current is reduced, after the programmed interval, the line voltage will normally rise. It could remain above the detector threshold when the fault conditions disappear. The threshold is therefore increased in protection mode.

The telephone line may, in some circumstances, be open-circuited for short intervals. To ensure correct operation when the connection is re-established the charge on the dc mask decoupling capacitors C1 and C2, and of course, the programming data, must be preserved. In normal operation the supply reservoir capacitor C4 would discharge too rapidly, so a line break must switch the circuit to a power-down mode.

Line breaks are detected by monitoring the Voltage across resistor R2. While the magnitude of the voltage remains below a threshold, a signal is sent to a timer (not shown). After a ;short interval, to distinguish a line break from an overload signal, all circuits, except those required to preserve the programming data, are switched off. All circuit nodes connected to the dc mask decoupling capacitors C1 and C2 are, then, high impedance.

The line current must be reduced to virtually zero during the "break" periods and rapidly re-established at its normal level during the "make" periods. To preserve the charge on the dc mask decoupling capacitors C1 and C2, and the programming information, the circuit is switched to a power-down mode during the "break" periods, as during line breaks.

The circuit is designed to preserve charge on the dc mask decoupling capacitors C1 and C2 while accepting high line voltage transients at the switching instants.

The circuit cannot provide base drive to transistor Q2 in normal operation unless the IC supply voltage is sufficient but it is transistor Q2 that charges the reservoir capacitor C4. A starting circuit is therefore provided. It is placed between the input of amplifier A5 and the base of transistor Q1 and diverts the current through resistor R0 to the base of transistor Q1. The circuit is active if the supply voltage is low, or if the circuit is switched to power-down mode. The current is, however, absorbed at the base of transistor Q1 during the "break" period of pulse dialling, as it would, otherwise, maintain the line current. Normal operation is, of course, re-established during the "make" periods when the power-down command is removed.

The circuit should also be able to receive "Caller Identification" signals transmitted between the first and second ring signals without being recognised as "Off-Hook" by the exchange. To meet this requirement it is switched to a low current consumption mode and the dc mask is programmed to a constant current characteristic, sufficient only to power the circuit. Because the identification signal are low level, and the circuit must not transmit, the line current can be set to a value well below the detection threshold of the exchange.

While an acceptably low current can maintain the necessary circuit functions it cannot charge the reservoir capacitor C4 in time to receive the identification signal. The capacitor C4 is therefore pre-charged by a current obtained from the first ring signal.

At voice-band frequencies, the local feedback loop formed by amplifiers A5 and Gm2 is decoupled by capacitor C2. A line signal causes a current to flow via resistor R0, capacitor C1 and resistors R9 and R1 into the output of amplifier A6, which is designed to present negligible impedance. The voltage across resistor R1, applied to the non-inverting input of amplifier A1, causes a line current to flow via transistor Q2. The voltage thus developed across resistor R2 coupled via resistor R3 to the input of amplifier A6 provides negative feedback. Assuming high loop gain the non-inverting input of amplifier A1 dan be considered a virtual earth.

Assuming capacitor C1 to have negligible impedance then, by summing the currents into the virtual earth, we obtain the relationship between the ac line voltage $U_L$ and the ac line current $i_L$:

$$\frac{v_L}{i_L} = R_2 + \frac{R_2(R_0 + R_9)}{R_1} \frac{R_5}{R_3 + R_5} \frac{1 + sC_3R_4}{1 + sC_3\left(R_4 + \frac{R_3R_5}{R_3 + R_5}\right)}$$

where s is the Laplace operator.

For later use we shall define this as:

$$\frac{v_L}{i_L} = R_2 + \frac{R_2(R_0 + R_9)}{R_1} H_{(s)}$$

The input impedance $Z_{IN}$ is usually specified as a resistance Ra, in series with a parallel RC combination Rb, Cb. Thus:

$$Z_{IN} = R_a + \frac{R_b}{1 + sC_bR_b}$$

To match these forms we first subtract $R_2$ from Ra. We then need to satisfy the equation:

$$\frac{(R_a + R_b - R_2)\left[1 + sC_b\frac{R_b(R_a - R_2)}{R_a + R_b - R_2}\right]}{1 + sC_bR_b} = \frac{R_2(R_0 + R_9)}{R_1} \frac{R_5}{R_3 + R_5} \frac{1 + sC_3R_4}{1 + sC_3\left(R_4 + \frac{R_3R_5}{R_3 + R_5}\right)}$$

With a network with the highest total resistance (Ra+Rb) and no resistor R5, in order to match the low frequency values:

$$(R_a + R_b - R_2) = \frac{R_2(R_0 + R_9)}{R_1}$$

Since resistors R0 and R2 are predetermined for the dc masks and resistor R9 is relatively small, this determines the value of resistor R1. For the other networks, resistor R5 must be chosen to ensure that the low frequency values match, since resistor R3 is determined for the dc masks, leaving the values of resistor R4 and capacitor C3 to be determined to match the poles and zeros in each case.

The circuit is designed to provide optimum hybrid balance when matched to the line impedance. A transmit signal at the inverting input of amplifier A1 will be matched at the non-inverting input of amplifier A1 due to the overall feedback. It will therefore appear at the non-inverting input of amplifier A4. The line current signal, transferred via amplifier A6, is doubled by amplifier A2 and applied to the non-inverting input of amplifier A4.

If the telephone line 2 was open circuit, it is evident that the transmit voltage gain would be, neglecting the impedance of capacitor C1:

$$\frac{R_0 + R_1 + R_9}{R_1}$$

For a matched line, the line current due to a voltage $V_s$ at the output of amplifier A3 will therefore be:

$$i_L = v_s \frac{R_0 + R_1 + R_9}{R_1} \frac{1}{2Z_{IN}}$$

The voltage at the input of amplifier A2 will then be:

$$v_s = \frac{R_0 + R_1 + R_9}{R_1} \frac{1}{2Z_{IN}} R_2 H_{(s)} = v_s \frac{Z_{IN} - R_2(1 - H_{(s)})}{2Z_{IN}}$$

Thus if amplifier A2 has a gain of 2, its output will be close to $V_s$ and the differential signal at the input of amplifier A4 will be near zero, as required for hybrid balance. It will be seen from the above equation that although simultaneous impedance matching and hybrid balance cannot be exactly obtained, the gain of amplifier A2 should be slightly higher than 2 for the best results.

The circuit should have a flat frequency response for both transmit and receive when coupled to a matched line.

If the telephone line 2 was open circuit, the transmit voltage gain from the output of amplifier A3 would be, neglecting the impedance of capacitor C1:

$$\frac{R_0 + R_1 + R_9}{R_1}$$

For a matched line the gain will be simply half this value.

In the receive case, for a matched line, the input current due to a line signal will be:

$$i_L = \frac{v_L}{2Z_{IN}}$$

The overall feedback will cause the signal at the non-inverting input of amplifier A1 to be zero, so the only signal applied to amplifier A4 is that from amplifier A2, which is, where M is the gain of amplifier A2:

$$I_L M R_2 H_{(s)} = \frac{v_L M R_2 H_{(s)}}{2Z_{IN}} = \frac{v_L(Z_{IN} - R_2)}{2Z_{IN}} \frac{MR_1}{R_0 + R_9}$$

It will be seen that the receive gain cannot be ideally flat except for real input impedances. The error will, however, be small.

As can be seen, therefore, the invention provides an interface circuit in which:

a) The dc characteristics presented to the line are determined by the resistors R0, R2 and R3 and the ratio of the gains of amplifiers Gm2, Gm3;

b) The ac impedance presented to the line is determined by resistors R0, R1 and R2 and the network formed by resistors R3, R4 and R5, and capacitor C3;

c) The hybrid balance impedance is substantially equal to the ac impedance presented to the line;

d) The transmit and receive gains are substantially independent of frequency when the input impedance is matched to the line.

Although only one embodiment of an interface circuit according to the invention has been described in detail, it will be apparent to a person skilled in the art that various modifications and improvements may be made without departing from the scope of the invention.

What I claim is:

1. A telephone line interface circuit comprising:

a transmit path for coupling to a telephone line;

a receive path for coupling to the telephone line;

a first network circuit for generating from the telephone line a first signal representing the a.c. and d.c. line voltage;

a second network circuit for generating from the telephone line a second signal representing the a.c. and d.c. line current, wherein the transmit path comprises a first amplifier having an output for coupling to the telephone line, a first input for receiving a signal to be transmitted and a second input coupled to receive a composite signal, the composite signal comprising a d.c. bias signal combined with first signal and the second signal, wherein said first and second network circuits are arranged so as to establish negative feedback loops between the output and second input of the first amplifier such that the amplitudes of the a.c. and d.c. signals applied by the telephone line interface circuit to the telephone line and the a.c. impedance and incremental d.c. resistance presented to the telephone line are dependent on said signal to be transmitted, the d.c. bias signal and the first and second network circuits, and wherein the receive path comprises a second amplifier, a first input for receiving the composite signal and a second input coupled to receive a third signal, the third signal being substantially equal to twice the second signal such that when the telephone line a.c. impedance matches the a.c. impedance presented thereto by the telephone line interface circuit, the line voltage and line current components of a signal received at the inputs of the second amplifier in response to a signal transmitted from the telephone line interface circuit via the transmit path substantially cancel, whereas the line voltage and line current components add when the received signal originates from the telephone line.

2. A telephone line interface circuit according to claim 1, wherein the second network circuit comprises reactive elements such that the impedance presented to the telephone line is complex.

3. A telephone line interface circuit according to claim 2, wherein the second network circuit is one of a plurality of network circuits, each of which can be switched in to the path of the a.c. line current signal, whereby each of said networks causes a different predetermined impedance to be presented to the telephone line.

4. A telephone line interface circuit according to claim 1, wherein the d.c. line voltage signal is obtained from the telephone line via a non-linear processing circuit means such that the interface circuit presents a predetermined non-linear d.c. characteristic to the telephone line.

5. A telephone line interface circuit according to claim 4, wherein said non-linear processing circuit means is programmable such that the predetermined non-linear d.c. characteristic presented to the telephone line can be varied.

* * * * *